United States Patent
Ban et al.

(10) Patent No.: US 11,657,520 B2
(45) Date of Patent: May 23, 2023

(54) ELECTRONIC DEVICE AND METHOD FOR CONTROLLING SAME

(71) Applicant: Samsung Electronics Co., Ltd., Suwon-si (KR)

(72) Inventors: Daehyun Ban, Suwon-si (KR); Woojin Park, Suwon-si (KR); Seongwon Han, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 351 days.

(21) Appl. No.: 16/771,922

(22) PCT Filed: Jan. 3, 2019

(86) PCT No.: PCT/KR2019/000101
§ 371 (c)(1),
(2) Date: Jun. 11, 2020

(87) PCT Pub. No.: WO2019/168264
PCT Pub. Date: Sep. 6, 2019

(65) Prior Publication Data
US 2020/0402251 A1 Dec. 24, 2020

(30) Foreign Application Priority Data
Feb. 27, 2018 (KR) .................. 10-2018-0023986

(51) Int. Cl.
*G06T 7/50* (2017.01)
*G06T 7/593* (2017.01)
(Continued)

(52) U.S. Cl.
CPC ............... *G06T 7/50* (2017.01); *G06F 18/21* (2023.01); *G06F 18/24* (2023.01); *G06N 20/00* (2019.01);
(Continued)

(58) Field of Classification Search
CPC .......... G06T 7/593; G06T 2207/10012; G06T 2207/10028; G06T 2207/20081;
(Continued)

(56) References Cited

U.S. PATENT DOCUMENTS 9,609,307 B1 3/2017 Lopez et al.
9,811,756 B2 11/2017 Liu et al.
(Continued)

FOREIGN PATENT DOCUMENTS

CN 105359190 A 2/2016
CN 106157307 A 11/2016
(Continued)

OTHER PUBLICATIONS

"How the Matterport Platform Works", Matterport Inc., https://matterport.com/try-it, Dec. 1, 2017.
(Continued)

*Primary Examiner* — Wesley J Tucker
(74) *Attorney, Agent, or Firm* — Jefferson IP Law, LLP (57) ABSTRACT

Disclosed is an electronic device including a learning model having been learned according to an artificial intelligence algorithm. An electronic device according to the present disclosure may comprise: an input unit; and a processor which, when a two-dimensional image including at least one object is received through the input unit, acquires first depth information relating to at least one object by applying the two-dimensional image to a first learning model, acquires second depth information relating to the at least one object by applying the first depth information and actually measured depth data of the at least one object to a second learning model, and acquires three-dimensional information relating to the two-dimensional image on the basis of the
(Continued)

second depth information, wherein the first depth information is implemented to include depth data according to a type of the at least one object.

10 Claims, 7 Drawing Sheets

(51) Int. Cl.
*G06N 20/00* (2019.01)
*G06V 20/64* (2022.01)
*G06F 18/21* (2023.01)
*G06F 18/24* (2023.01)
*G06V 10/70* (2022.01)
*G06V 10/82* (2022.01)

(52) U.S. Cl.
CPC ............. *G06T 7/593* (2017.01); *G06V 10/70* (2022.01); *G06V 10/82* (2022.01); *G06V 20/64* (2022.01); *G06T 2207/10012* (2013.01); *G06T 2207/10028* (2013.01); *G06T 2207/20081* (2013.01)

(58) Field of Classification Search
CPC ............ G06T 7/50; G06T 2207/20084; G06K 9/6217; G06K 9/6267; G06K 9/62; G06N 20/00; G06N 3/0454; G06N 3/08; G06V 20/64; G06V 2201/12; G06V 10/70; G06V 10/82
See application file for complete search history.

(56) References Cited

U.S. PATENT DOCUMENTS

| | | | | |
|---|---|---|---|---|
| 10,043,285 | B2* | 8/2018 | Kim | G06K 9/627 |
| 10,176,404 | B2* | 1/2019 | Boulkenafed | G06V 10/764 |
| 10,353,271 | B2 | 7/2019 | Wang et al. | |
| 10,424,118 | B2 | 9/2019 | Hannemann et al. | |
| 10,929,654 | B2* | 2/2021 | Iqbal | G06V 40/107 |
| 11,087,494 | B1* | 8/2021 | Srinivasan | G06V 20/584 |
| 2013/0141433 | A1 | 6/2013 | Astrand | |
| 2017/0069094 | A1 | 3/2017 | Kim | |
| 2017/0200317 | A1 | 7/2017 | Hannemann et al. | |
| 2017/0278402 | A1 | 9/2017 | Yalla et al. | |
| 2017/0304732 | A1* | 10/2017 | Velic | G06V 20/66 |
| 2018/0231871 | A1 | 8/2018 | Wang et al. | |
| 2018/0336423 | A1 | 11/2018 | Ban et al. | |
| 2019/0026956 | A1* | 1/2019 | Gausebeck | G06T 19/20 |
| 2019/0130639 | A1* | 5/2019 | Boyce | G06F 3/013 |
| 2019/0286884 | A1 | 9/2019 | Rhee et al. | |
| 2020/0169717 | A1* | 5/2020 | Zavesky | G06V 20/20 |
| 2020/0376675 | A1* | 12/2020 | Bai | G06K 9/6267 |
| 2021/0011476 | A1* | 1/2021 | Ban | G06V 10/757 |
| 2021/0306615 | A1* | 9/2021 | Jeong | H04N 13/293 |
| 2022/0188554 | A1* | 6/2022 | Huang | G06T 17/10 |

FOREIGN PATENT DOCUMENTS

| | | | |
|---|---|---|---|
| CN | 106981098 | A | 7/2017 |
| JP | 2015-504640 | A | 2/2015 |
| JP | 2017-142780 | A | 8/2017 |
| KR | 10-2014-0041012 | A | 4/2014 |
| KR | 10-2017-0000748 | A | 1/2017 |
| KR | 10-1808840 | B1 | 12/2017 |
| KR | 10-2018-0004635 | A | 1/2018 |
| KR | 10-2018-0125858 | A | 11/2018 |
| TW | 201520978 | A | 6/2015 |
| WO | 2015/035089 | A1 | 3/2015 |

OTHER PUBLICATIONS

David Eigen et al., Depth Map Prediction from a Single Image using a Multi-Scale Deep Network, Department of Computer Science, Courant Institute, New York University, Facebook AI Research, Jun. 9, 2014.

Jae-Il Jung et al., Depth Map Estimation From Single-View Image Using Object Classification Based On Bayesian Learning, Gwangju Institute of Science and Technology (GIST), Jun. 7, 2010.

Zhen-jie Lu et al., Scene Depth Estimation for Single Digital Image in Multi-scaled Space, College of Mechanical and Automation, Shanghai University, Computer Technology and Development, vol. 23, No. 1, Jan. 10, 2013.

Bao Zhenqiang et al., Research Progress of Deep Learning in Visual Localization and Three-Dimensional Structure Recovery, Rocket Force University of Engineering, Laser & Optoelectronics Progress, Dec. 8, 2017.

Korean Office Action dated Mar. 13, 2023, issued in Korean Application No. 10-2018-0023986.

Chinese Office Action dated Mar. 24, 2023, issued in Chinese Application No. 201980008878.0.

* cited by examiner

ELECTRONIC DEVICE AND METHOD FOR CONTROLLING SAME

TECHNICAL FIELD

The disclosure relates to an electronic device which obtains three-dimensional information from two-dimensional image and a method for controlling the same.

BACKGROUND ART

Electronic devices using three-dimensional image data have come into use with development of electronic technologies. In particular, the three-dimensional image data may be used in various fields such as electronic industries, medical industries, entertainment industries, and the like.

In general, three-dimensional data is obtained by an image capturing device which separately obtains depth information such as a stereo camera. However, there was a problem that three-dimensional image data such as depth information was hardly obtained with a general monochrome camera generally used by an ordinary person. In addition, there was a problem that an ordinary person found it difficult to process depth information and use it in a two-dimensional image, although he/she uses a stereo camera.

Meanwhile, there was a problem that three-dimensional image data obtained by the stereo camera was difficult to use in various industry fields due to lack of information regarding types of captured objects.

DISCLOSURE

Technical Problem

The disclosure is made in view of the above needs and an object of the disclosure is to provide three-dimensional image information by applying a two-dimensional image to an artificial intelligence learning model according to an artificial intelligence algorithm.

Technical Solution

According to an embodiment of the disclosure, there is provided an electronic device including a learning model trained according to an artificial intelligence algorithm, an input unit, and a processor configured to, based on a two-dimensional image including at least one object being received via the input unit, obtain first depth information regarding the at least one object by applying the two-dimensional image to a first learning model, obtain second depth information regarding the at least one object by applying the first depth information and ground truth depth data of the at least one object to a second learning model, and obtain three-dimensional information regarding the two-dimensional image based on the second depth information, in which the first depth information includes depth data according to a type of the at least one object.

The processor may be configured to obtain information regarding the type of the at least one object by applying the two-dimensional image to the first learning model.

The first depth information may include a depth value corresponding to each of a plurality of pixels included in the object, and the processor may be configured to obtain the second depth information by adjusting the depth value according to a Euclidean distance between the depth value and the ground truth depth data corresponding to each of the plurality of pixels by applying the depth value to the second learning model.

The depth data included in the first learning model may be a representative depth value generalized according to the type of the object, and the ground truth depth data included in the second learning model may be a ground truth depth value obtained by capturing the at least one object with a stereo camera.

The electronic device may further include an image capturing unit, the image capturing unit may include a monochrome camera, and the two-dimensional image is an image captured by the monochrome camera.

According to another embodiment of the disclosure, there is provided a method for controlling an electronic device, the method further including, based on a two-dimensional image including at least one object being received, obtaining first depth information regarding the at least one object by applying the two-dimensional image to a first learning model, obtaining second depth information regarding the at least one object by applying the first depth information and ground truth depth data of the at least one object to a second learning model, and obtaining three-dimensional information regarding the two-dimensional image based on the second depth information, in which the first depth information includes depth data according to a type of the at least one object.

The obtaining first depth information may include obtaining information regarding the type of the at least one object by applying the two-dimensional image to the first learning model.

The first depth information may include a depth value corresponding to each of a plurality of pixels included in the object, and the obtaining second depth information may include obtaining the second depth information by adjusting the depth value according to a Euclidean distance between the depth value and the ground truth depth data corresponding to each of the plurality of pixels by applying the depth value to the second learning model.

The depth data included in the first learning model is a representative depth value generalized according to the type of the object, and the ground truth depth data included in the second learning model may be a ground truth depth value obtained by capturing the at least one object with a stereo camera.

The two-dimensional image is an image captured by the monochrome camera.

According to still another embodiment of the disclosure, there is provided a non-transitory computer readable medium storing computer instructions to enable an electronic device to execute an operation, based on the computer instructions being executed by a processor of the electronic device, in which the operation includes, based on a two-dimensional image including at least one object being received, obtaining first depth information regarding the at least one object by applying the two-dimensional image to a first learning model, obtaining second depth information regarding the at least one object by applying the first depth information and ground truth depth data of the at least one object to a second learning model, and obtaining three-dimensional information regarding the two-dimensional image based on the second depth information, in which the first depth information includes depth data according to a type of the at least one object.

The obtaining first depth information may include obtaining information regarding the type of the at least one object by applying the two-dimensional image to the first learning model.

The first depth information may include a depth value corresponding to each of a plurality of pixels included in the object, and the obtaining second depth information may include obtaining the second depth information by adjusting the depth value according to a Euclidean distance between the depth value and the ground truth depth data corresponding to each of the plurality of pixels by applying the depth value to the second learning model.

The depth data included in the first learning model may be a representative depth value generalized according to the type of the object, and the ground truth depth data included in the second learning model may be a ground truth depth value obtained by capturing the at least one object with a stereo camera.

The two-dimensional image may be an image captured by the monochrome camera.

Effect of Invention

As described above, according to the embodiments of the disclosure, a user is able to easily obtain three-dimensional information regarding a two-dimensional image only by capturing the two-dimensional image.

DETAILED DESCRIPTION OF EXEMPLARY EMBODIMENTS

The disclosure will be described in detail after briefly explaining the terms used in the specification.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there is also a term arbitrarily selected by the applicant, in which case their meaning will be described in detail in the description of the disclosure. Therefore, the terms used in the disclosure should be defined based on the meanings of the terms themselves and the contents throughout the disclosure, rather than the simple names of the terms.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In describing the disclosure, a detailed description of the related art is omitted when it is determined that the detailed description may unnecessarily obscure a gist of the disclosure.

The terms "first," "second," or the like may be used for describing various elements but the elements may not be limited by the terms. The terms are used only to distinguish one element from another.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

A term such as "module" or a "unit" in the disclosure may perform at least one function or operation, and may be implemented as hardware, software, or a combination of hardware and software. Further, except for when each of a plurality of "modules", "units", and the like needs to be realized in an individual hardware, the components may be integrated in at least one module and be implemented in at least one processor (not shown).

Hereinafter, with reference to the accompanying drawings, embodiments of the disclosure will be described in detail so that those skilled in the art can easily make and use the embodiments in the technical field of the disclosure. But, the disclosure may be implemented in various different forms and is not limited to the embodiments described herein. In addition, in the drawings, the parts not relating to the description are omitted for clearly describing the disclosure, and the same reference numerals are used for the same parts throughout the specification.

Figure 1:
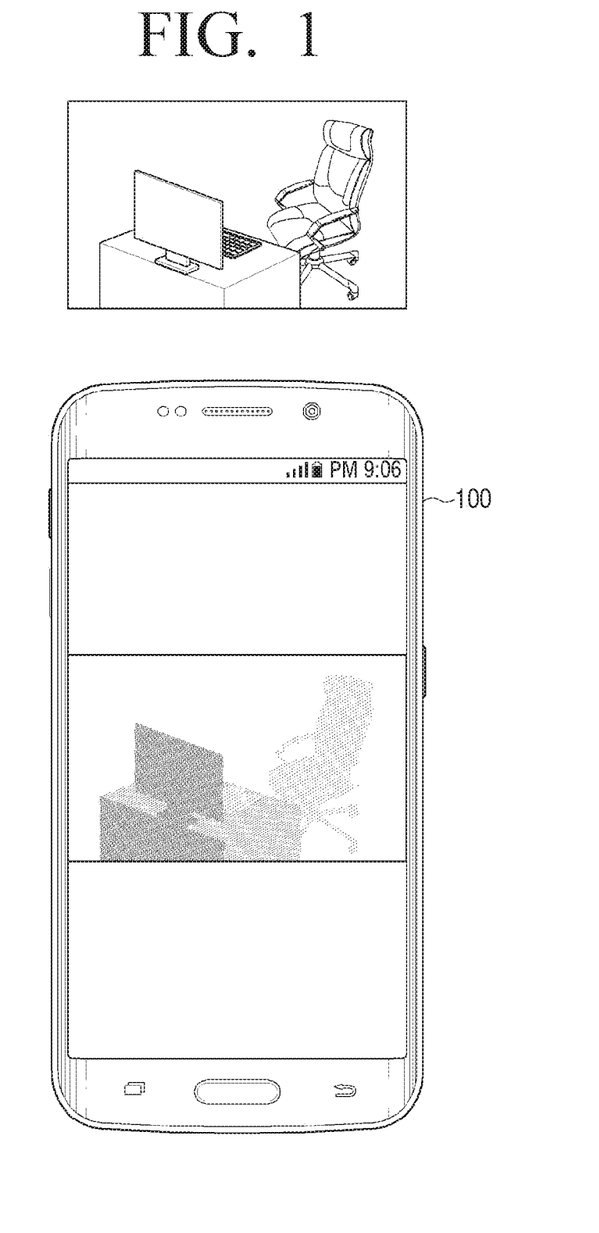
FIG. 1 is a view for explaining an operation of obtaining three-dimensional information from a two-dimensional image by using an electronic device according to an embodiment.

FIG. 1 is a view for explaining an operation of obtaining three-dimensional information from a two-dimensional image by using an electronic device according to an embodiment of the disclosure.

According to an embodiment of the disclosure, an electronic device 100 may be implemented as a smartphone including a monochrome camera. This is for convenience of description, and the electronic device 100 may include various electronic devices capable of receiving a two-dimensional image from outside, if the electronic device 100 does not include the camera. Accordingly, the electronic device 100 may be implemented as various devices such as a computer, a TV, a set-top box, a smartphone, a smart watch, and the like. The electronic device 100 may also include the camera and a receiving unit capable of receiving a two-dimensional image at the same time.

According to an embodiment of the disclosure, the electronic device 100 may capture a view outside. The electronic device 100 may obtain three-dimensional information from a two-dimensional image obtained by capturing the view outside. The electronic device 100 according to another embodiment may obtain three-dimensional information by receiving a two-dimensional captured image from an external device. For example, the three-dimensional information may be obtained with a depth map.

The electronic device 100 may obtain three-dimensional information by applying a two-dimensional image to various learning models according to an artificial intelligence algorithm.

In this case, the electronic device 100 may obtain brief depth information according to the type of an object included in a two-dimensional image by applying the two-dimensional image to a first learning model.

Then, the electronic device 100 may obtain depth information having a high accuracy by applying the obtained depth information and ground truth depth data (or survey depth data or measurement data depth data) to a second learning model. That is, after obtaining brief depth information through classification learning according to the object type, the electronic device 100 may obtain sophisticated depth information by adjusting the brief depth information to be close to the ground truth depth data.

Figure 2:
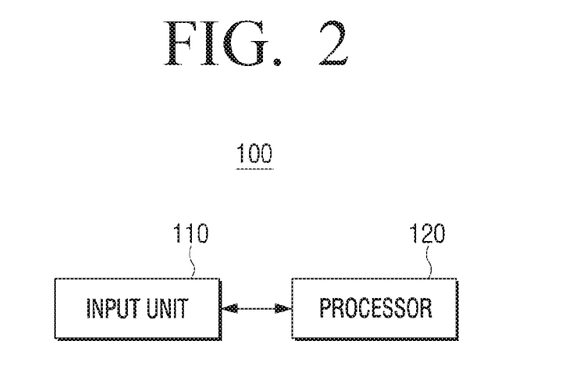
FIG. 2 is a block diagram for explaining a configuration of the electronic device according to an embodiment.

FIG. 2 is a block diagram for explaining a configuration of the electronic device according to an embodiment of the disclosure.

The electronic device 100 according to an embodiment of the disclosure may include an input unit 110 and a processor 120.

The input unit 110 may obtain a two-dimensional image and transmit the two-dimensional image to the processor 120. In this case, the two-dimensional image may include at least one object.

According to an embodiment of the disclosure, the input unit 110 may receive a two-dimensional image from an external device. Specifically, the input unit 110 may include at least one input port for receiving the two-dimensional image. Each port may include, for example, DP, USB, HDMI, RGB, DVI, Thunderbolt, MHL, AES/EBU, Optical, Coaxial, and the like.

According to another embodiment of the disclosure, the input unit 110 may include at least one communication module. In this case, the input unit 110 may receive the two-dimensional image from an external device or a server. For example, the input unit 110 may execute communication through various communication systems such as Infrared (IR), Wireless Fidelity (WI-FI), Bluetooth, Zigbee, Beacon, near field communication (NFC), WAN, Ethernet, or IEEE 1394. The input unit 110 may also include all of the input port and the communication module.

The processor 120 controls general operations of the electronic device 100.

According to an embodiment of the disclosure, the processor 120 may be implemented as a digital signal processor (DSP), a microprocessor, or a time controller (TCON) processing digital signals. However, there is no limitation thereto, and the processor 120 may include one or more of a central processing unit (CPU), a microcontroller unit (MCU), a microprocessing unit (MPU), a controller, an application processor (AP), or a communication processor (CP), and an ARM processor or may be defined as the corresponding term. In addition, the processor 120 may be implemented as System on Chip (SoC) or large scale integration (LSI) including the processing algorithm or may be implemented in form of a Field Programmable gate array (FPGA).

When the two-dimensional image including at least one object is received via the input unit 110, the processor 120 may obtain first depth information regarding the at least one object by applying the two-dimensional image to the first learning model. Specifically, the processor 120 may execute the learning with classification among various learning methods of deep learning.

The first depth information may include depth data according to the type of the at least one object. For example, the processor 120 may obtain a depth value corresponding to the type of the object included in the two-dimensional image and each pixel included in the object by applying the two-dimensional image to the first learning model.

In this case, the processor 120 may train the first learning model with depth data according to the type of the object.

The depth data may include a representative depth value generalized according to the type of the object. Specifically, the processor 120 may obtain a depth value generalized for each type of the object according to the first learning model, and the processor 120 may train the first learning model with the depth value for each type of the object to perform the training with the representative depth value generalized for each type of the object.

For example, if the type of the object is a vehicle, generally, a headlight part of the vehicle is positioned in front of a windshield. The processor 120 may obtain a generalized depth value showing that a depth value of the headlight of the vehicle is lower than the depth value of the windshield of the vehicle according to the first learning model through training. In addition, the processor 120 may identify specific shapes of the vehicle such as the headlight, the windshield, and the like according to the first learning model and may identify that the type of the object included in the two-dimensional image is the vehicle according to the first learning model.

The processor 120 may obtain the first depth information corresponding to each pixel included in the object by applying each pixel value included in the object of the two-dimensional image to the first learning model. That is, the processor 120 may train the first learning model with the first depth information corresponding to each pixel value.

By doing so, the processor 120 may obtain the first depth information according to the type of the object by the first learning model.

The processor 120 may obtain second depth information by applying the first depth information and ground truth depth data of the at least one object to the second learning model, and obtain three-dimensional information regarding the two-dimensional image based on the second depth information.

For example, the first depth information obtained by the processor 120 may include a depth value approximated according to the object type. Accordingly, the processor 120 may obtain the three-dimensional information based on the second learning model using the ground truth depth data to obtain a sophisticated depth value.

In this case, the ground truth depth data may include a depth value obtained by a stereo camera. In addition, the ground truth depth data may be provided in a simulation environment in which accurate depth data is able to be obtained. The ground truth depth data may be stored in a storage 130 or received from an external device or a server.

In addition, the processor 120 may obtain the second depth information by applying the depth value corresponding to each of a plurality of pixels included in the first depth information to the second learning mode, and adjusting the depth value according to Euclidean distance between the depth value and the ground truth depth data corresponding to each of the plurality of pixels.

Specifically, the processor 120 may obtain the Euclidean distance between the first depth information estimated by the first learning model and the ground truth depth data by using the second learning model, and obtain the second depth information obtained by minimizing loss of the depth based on the obtained distance.

In this case, the processor 120 may obtain the Euclidean distance of the depth value included in each pixel by causing each pixel included in the first depth information to correspond to each pixel included in the ground truth depth data by using the second learning model.

In addition, the processor 120 may obtain the second depth information by adjusting the depth value of the first depth information to minimize an average of the plurality of Euclidean distances obtained by using the second learning model.

The second depth information obtained by the processor 120 may include information regarding the type of the object. Specifically, the processor 120 may obtain information regarding type of the object based on the depth value included in the second depth information which is more sophisticated than the depth value included in the first depth information. In this case, the processor 120 may obtain information with a higher accuracy than the information regarding the type of the object obtained based on the depth value included in the first depth information.

Accordingly, the processor 120 may obtain the second depth information more sophisticated than the first depth information based on the first depth information obtained according to the type of the object and the ground truth depth data.

The processor 120 may obtain three-dimensional information regarding the two-dimensional image based on the second depth information. For example, the processor 120 may obtain the three-dimensional image such as a distance from the object, a relative position, XYZ coordinate value based on the second depth information.

Figure 3:
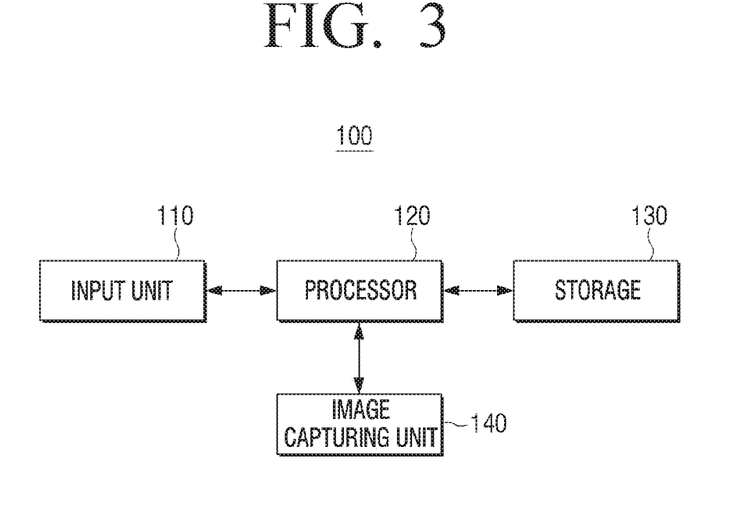
FIG. 3 is a block diagram for explaining a specific configuration of the electronic device according to an embodiment.

FIG. 3 is a block diagram for explaining a specific configuration of the electronic device according to an embodiment of the disclosure.

The electronic device 100 according to an embodiment of the disclosure may include the input unit 110, the processor 120, a storage 130, and an image capturing unit 140.

The storage 130 stores various pieces of data necessary for the operations of the electronic device 100. In an example, the storage 130 may store various learning models trained according to artificial intelligence algorithms for obtaining three-dimensional information from the two-dimensional image.

Particularly, the storage 130 may store data necessary for the processor 120 to execute various processes. For example, the storage 130 may be implemented as an internal memory such as a ROM, a RAM, or the like included in the processor 120 or may be implemented as a memory separated from the processor 120. In such a case, the storage 130 may be implemented in a form of a memory embedded in the electronic device 100 or implemented in a form of a memory detachable from the electronic device 100 according to data storage purpose. For example, data for operating the electronic device 100 may be stored in a memory embedded in the electronic device 100, and data for an extended function of the electronic device 100 may be stored in a memory detachable from the electronic device 100. The memory embedded in the electronic device 100 may be implemented as a non-volatile memory, a volatile memory, a flash memory, a hard disk drive (HDD), or a solid state drive (SSD), and the memory detachable from the electronic device 100 may be implemented as a memory card (e.g., micro SD card or USB memory), external memory connectable to the USB port (e.g., USB memory).

The image capturing unit 140 may capture a view outside as a two-dimensional image. According to an embodiment, the image capturing unit 140 may include a monochrome camera. The image capturing unit 140 may obtain a two-dimensional image consisting of a plurality of pixels with respect to a specific area of the view outside. The image capturing unit 140 may transmit the obtained two-dimensional image to the processor 120.

Unlike the stereo camera, the monochrome camera means a camera which is not able to directly obtain three-dimensional information (for example, depth value) by capturing the view outside. In such a case, the image capturing unit 140 may be implemented as an image sensor such as a charge coupled device (CCD) or a complementary metal oxide semiconductor (CMOS). The CCD is a device in which electric charge carrier is stored in a capacitor and carried, while each metal-oxide silicon (MOS) capacitor is located at very close distance. The CMOS image sensor is a device which uses a switching method for creating MOS transistors by the number of pixels using the CMOS technology using a control circuit and a signal processing circuit as peripheral circuits and sequentially detecting output by using this.

Figure 4A:
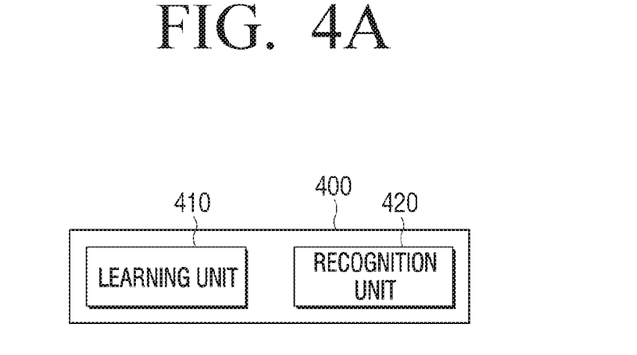
FIG. 4A is a view for explaining a configuration of a processor for implementing an artificial intelligence algorithm according to an embodiment.

FIG. 4A is a view for explaining a configuration of a processor for implementing an artificial intelligence algorithm according to an embodiment of the disclosure.

Referring to FIG. 4A, a processor 400 may include at least one of a learning unit 410 and a recognition unit 420. The processor 400 of FIG. 4A corresponds to the processor 120 of FIGS. 2 and 3.

The learning unit 410 may generate or train a recognition model having a criterion for predetermined state determination. The learning unit 410 may generate a recognition model having a determination criterion by using collected learning data.

In an example, the learning unit 410 may generate, train, or update an object recognition model having a criterion for determining the type of the object included in the image by using at least one of the two-dimensional image including the object and the depth value as learning data.

In another example, the learning unit 410 may generate, train, or update a depth recognition model having a criterion for determining a depth of the object by using at least one of the two-dimensional image including the object and the depth value as learning data.

The recognition model described above may include the first learning model and the second learning model.

The recognition unit 420 may predict a recognition target included in predetermined data by using the predetermined data as input data of the trained recognition model.

For example, the recognition unit 420 may obtain, predict, or infer information regarding the type of the object included in the two-dimensional image by using at least one of the two-dimensional image including the object and the depth value as the input data of the trained recognition model.

In another example, the recognition unit 420 may obtain, predict, or infer depth information regarding the object included in the two-dimensional image by using at least one of the two-dimensional image including the object and the depth value as the input data of the trained recognition model.

At least a part of the learning unit 410 and at least a part of the recognition unit 420 may be implemented as a software module or manufactured in a form of at least one hardware chip and mounted on the electronic device 100.

For example, at least one of the learning unit 410 and the recognition unit 420 may be manufactured in a form of a dedicated hardware chip for artificial intelligence (AI) and may be manufactured as a part of the conventional generic-purpose processor (e.g., CPU or application processor) or a graphic dedicated processor (e.g., GPU) and mounted on various electronic devices described above or object recognition devices. The dedicated hardware chip for artificial intelligence is a dedicated processor specialized in possibility calculation and may rapidly process the calculation operations in the artificial intelligence field such as machine learning with higher performance of parallel processing than the conventional generic-purpose processor. If the learning unit 410 and the recognition unit 420 are implemented as software module (or program module including instructions), the software module may be stored in a non-transitory computer readable medium. In this case, the software module may be provided by an operating system (O/S) or provided by a predetermined application. In addition, a part of the software module may be provided by the operating system (O/S) and the other part may be provided by the predetermined application.

In this case, the learning unit 410 and the recognition unit 420 may be mounted on one electronic device or may be mounted on separate electronic devices, respectively. For example, one of the learning unit 410 and the recognition unit 420 may be included in the electronic device 100 and the other one thereof may be included in an external server. In addition, the learning unit 410 and the recognition unit 420 may be connected in a wired or wireless manner so that the learning unit 410 may provide constructed model information to the recognition unit 420 and the data input to the recognition unit 420 may be provided to the learning unit 410 as additional learning data.

Figure 4B:
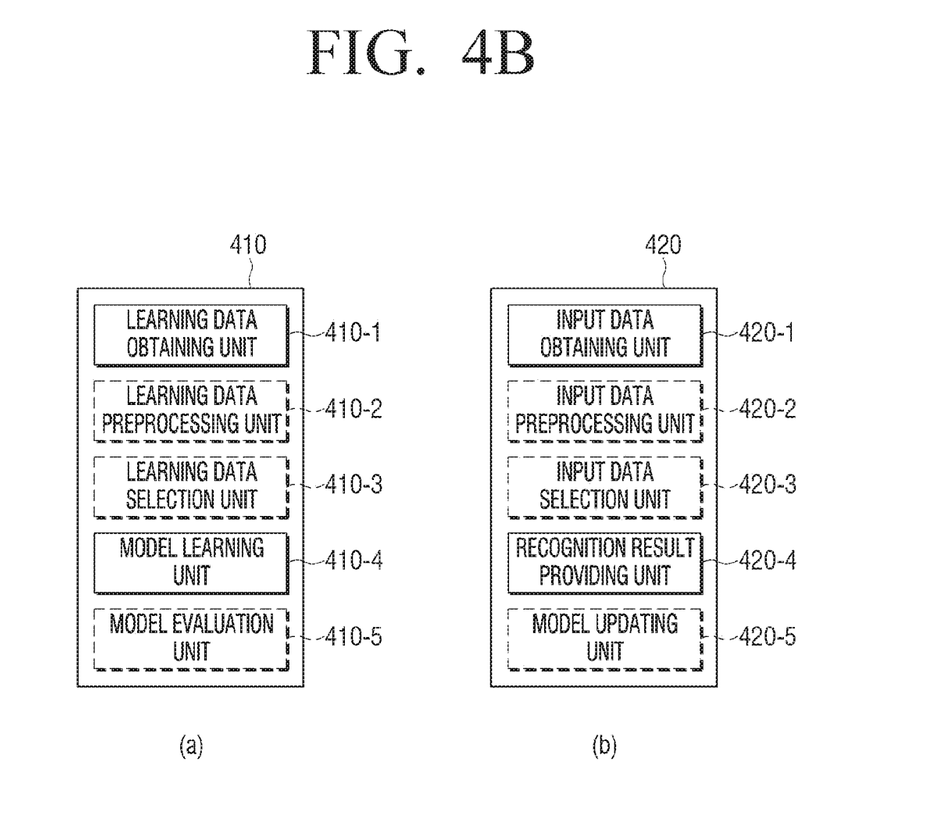
FIG. 4B is a view for explaining a specific configuration of a learning unit and a recognition unit according to an embodiment.

FIG. 4B is a view for explaining a specific configuration of the learning unit and the recognition unit according to an embodiment of the disclosure.

Referring to (a) of FIG. 4B, the learning unit 410 according to an embodiment may include a learning data obtaining unit 410-1 and a model learning unit 410-4. In addition, the learning unit 410 may further selectively include at least one of a learning data preprocessing unit 410-2, a learning data selection unit 410-3, and a model evaluation unit 410-5.

The learning data obtaining unit 410-1 may obtain learning data necessary for a recognition model for predicting a recognition target. According to an embodiment of the disclosure, the learning data obtaining unit 410-1 may obtain at least one of a two-dimensional image including the object, information regarding the type of the object, the first depth information, and the ground truth depth data of the object as the learning data. The learning data may be data collected or tested by the learning unit 410 or a manufacturer of the learning unit 410.

The model learning unit 410-4 may train the recognition model to have a determination criterion regarding how to determine a predetermined recognition target by using the learning data. For example, the model learning unit 410-4 may train the recognition model through supervised learning using at least a part of the learning data as the determination criterion. In addition, the model learning unit 410-4 may train the recognition model, for example, through unsupervised learning of finding out the determination criterion to determine a situation by self-training using learning data without particular supervision. In addition, the model learning unit 410-4 may train the recognition model, for example, through reinforcement learning using a feedback regarding whether or not a result of the situation determination according to the training is accurate. Further, the model learning unit 410-4 may train the recognition model, for example, by using a learning algorithm including error back-propagation or gradient descent.

In addition, the model learning unit 410-4 may train a selectin criterion regarding which learning data is to be used to predict the recognition target by using the input data.

If the number of recognition models constructed in advance is more than one, the model learning unit 410-4 may determine a recognition model with basic learning data that is highly relevant to the input learning data as the recognition model to be trained. In such a case, the basic learning data pieces may be classified in advance for each type of data and the recognition model may be constructed in advance for each type of data. For example, the basic learning data pieces may be classified in advance based on various criteria such as a region where the learning data is generated, time when the learning data is generated, a size of the learning data, a genre of the learning data, a creator of the learning data, a type of an object in the learning data, and the like.

For example, when the recognition model is trained, the model learning unit 410-4 may store the trained recognition model. In such a case, the model learning unit 410-4 may store the trained recognition model in the storage 130 of the electronic device 100. In addition, the model learning unit 410-4 may store the trained recognition model in a memory of a server connected to the electronic device 100 via a wired or wireless network.

The learning unit 410 may further include the learning data preprocessing unit 410-2 and the learning data selection unit 410-3 in order to improve an analysis result of the recognition model or save resources or time necessary for providing the recognition model.

The learning data preprocessing unit 410-2 may preprocess the obtained data so that the obtained data is used in the learning for situation determination. The learning data preprocessing unit 410-2 may process the obtained data in a predefined format so that the model learning unit 410-4 may use the obtained data for training for obtaining the depth information.

The learning data selection unit 410-3 may select data necessary for the learning from data obtained by the learning data obtaining unit 410-1 or the data preprocessed by the learning data preprocessing unit 410-2. The selected learning data may be provided to the model learning unit 410-4. The learning data selection unit 410-3 may select learning data necessary for learning from the obtained or preprocessed data according to a predetermined selection criterion. In addition, the learning data selection unit 410-3 may select learning data according to the predetermined selection criterion according to the learning performed by the model learning unit 410-4.

The learning unit 410 may further include the model evaluation unit 410-5 in order to improve an analysis result of the recognition model.

The model evaluation unit 410-5 may input evaluation data to the recognition model and may cause the model learning unit 410-4 to perform the training again, if the analysis result output from the evaluation data does not satisfy the predetermined criterion. In such a case, the evaluation data may be predefined data for evaluating the recognition model.

For example, if a number or a rate of the evaluation data pieces having inaccurate analysis results, among analysis results of the trained recognition model regarding the evaluation data, exceeds a predetermined threshold value, the model evaluation unit 410-5 may evaluate that the predetermined criterion is not satisfied.

If the number of trained recognition models is more than one, the model evaluation unit 410-5 may evaluate whether or not each of the trained recognition models satisfies the predetermined criterion, and determine a model satisfying the predetermined criterion as a final recognition model. In this case, if the number of models satisfying the predetermined criterion is more than one, the model evaluation unit 410-5 may determine any one or a predetermined number of models set in advance in the order of high evaluation grades as final recognition models.

Referring to (b) of FIG. 4B, the recognition unit 420 according to an embodiment may include a recognition data obtaining unit (or input data obtaining unit) 420-1 and a recognition result providing unit 420-4.

In addition, recognition unit 420 may further optionally include at least one of a recognition data preprocessing unit (or input data preprocessing unit) 420-2, a recognition data selection unit (or input data selection unit) 420-3, and a model updating unit 420-5.

The recognition data obtaining unit (or input data obtaining unit) 420-1 may obtain data necessary for obtaining the depth information. The recognition result providing unit 420-4 may obtain the depth information by applying the data obtained by the recognition data obtaining unit (or input data obtaining unit) 420-1 to the trained recognition model as an input value. The recognition result providing unit 420-4 may provide an analysis result according to the analysis purpose of the data. The recognition result providing unit 420-4 may obtain the analysis result by applying data preprocessed by the recognition data preprocessing unit (input data preprocessing unit) 420-2 or selected by the recognition data selection unit (input data selection unit) 420-3 which will be described later to the recognition model as an input value. The analysis result may be determined by the recognition model.

In an embodiment, the recognition result providing unit 420-4 may obtain (or predict) the first depth information corresponding to the object by applying the two-dimensional image including the object obtained by the recognition data obtaining unit (or input data obtaining unit) 420-1 to the trained recognition model.

In another embodiment, the recognition result providing unit 420-4 may obtain (or predict) the second depth information corresponding to the object by applying the first depth information and the ground truth depth data of the object obtained by the recognition data obtaining unit (or input data obtaining unit) 420-1 to the trained recognition model.

The recognition unit 420 may further include the recognition data preprocessing unit (or input data preprocessing unit) 420-2 and the recognition data selection unit (or input data selection unit) 420-3 in order to improve the analysis result of the recognition model or save resources or time necessary for providing the analysis result.

The recognition data preprocessing unit (or input data preprocessing unit) 420-2 may preprocess the obtained data so that the obtained data is used for obtaining the depth information. The recognition data preprocessing unit (or input data preprocessing unit) 420-2 may process the obtained data in a predefined format so that the recognition result providing unit 420-4 easily uses the obtained data for obtaining the depth information.

The recognition data selection unit (or input data selection unit) 420-3 may select data necessary for obtaining the depth information from the data obtained by the recognition data obtaining unit (or input data obtaining unit) 420-1 and the data preprocessed by the recognition data preprocessing unit (or input data preprocessing unit) 420-2. The selected data may be provided to the recognition result providing unit 420-4. The recognition data selection unit (or input data selection unit) 420-3 may select some or all pieces of the obtained or preprocessed data according to predetermined selection criteria for situation determination. In addition, the recognition data selection unit (or input data selection unit) 420-3 may select data according to the predetermined selection criteria by the training of the model learning unit 410-4.

The model updating unit 420-5 may control the recognition model to be updated based on the evaluation of the analysis result provided by the recognition result providing unit 420-4. For example, the model updating unit 420-5 may request the model learning unit 410-4 to additionally train or update the recognition model by providing the analysis result provided by the recognition result providing unit 420-4 to the model learning unit 410-4.

Figure 5:
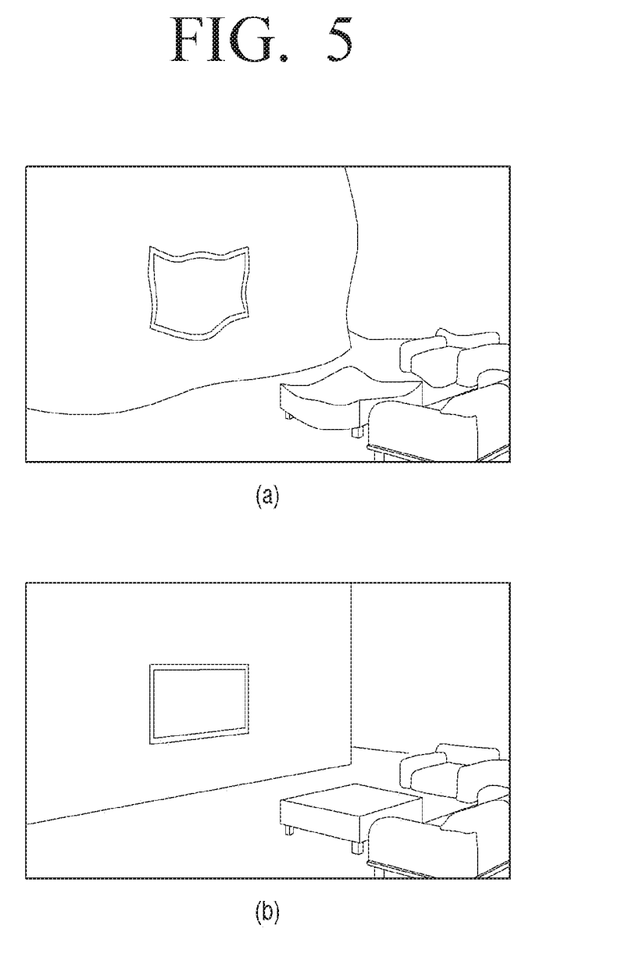
FIG. 5 is a view for explaining an image including three-dimensional information obtained according to an embodiment.

FIG. 5 is a view for explaining an image including three-dimensional information obtained according to an embodiment of the disclosure.

According to an embodiment of the disclosure, the processor 120 may apply the obtained three-dimensional information to the two-dimensional image. Specifically, the processor 120 may apply the three-dimensional information corresponding to the pixel included in the two-dimensional image to each pixel. By doing so, the processor 120 may obtain a virtual three-dimensional image using the two-dimensional image.

The processor 120 may rotate the three-dimensional image according to an input of a user.

Referring to (a) of FIG. 5, the image may be distorted due to a low accuracy of the depth information included in the three-dimensional image, in a case of rotating the three-dimensional image obtained by a conventional technology. But, referring to (b) of FIG. 5, the distortion of the image is reduced due to a high accuracy of the depth information included in the three-dimensional image, in a case of rotating the three-dimensional image obtained according to an embodiment of the disclosure.

Figure 6:
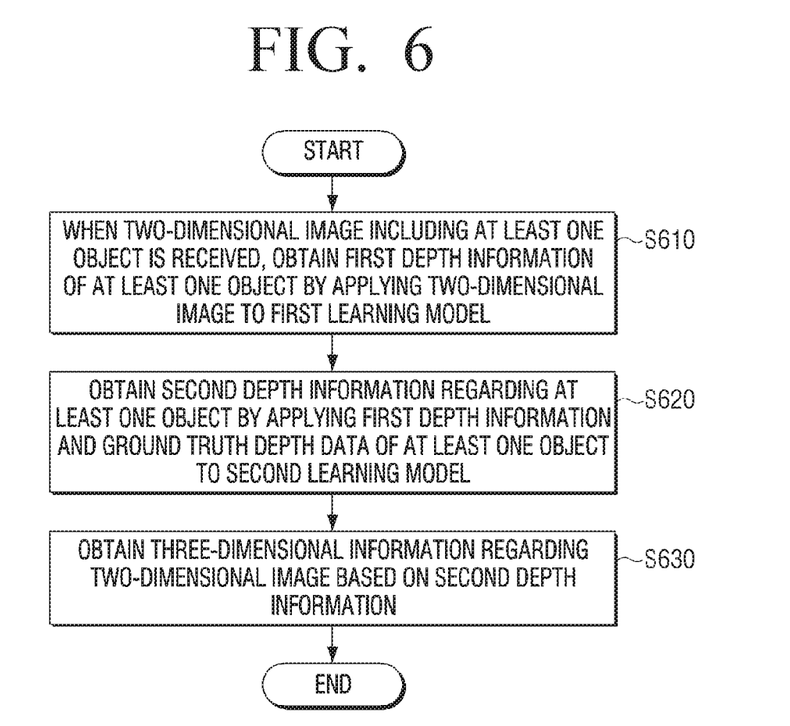
FIG. 6 is a flowchart for explaining a method for controlling the electronic device according to an embodiment.

FIG. 6 is a flowchart for explaining a method for controlling the electronic device according to an embodiment of the disclosure.

According to an embodiment of the disclosure, when a two-dimensional image including at least one object is received, the electronic device 100 may obtain first depth information regarding at least one object by applying the two-dimensional image to a first learning model (S610).

Specifically, the first depth information may include depth data according to the type of the at least one object. In addition, the first depth information may include information regarding the type of the object, in addition to the depth values.

In addition, the electronic device 100 may identify the type of the object included in the two-dimensional image using the first learning model and obtain a representative depth value of the object according to the identified type.

The electronic device 100 may obtain the second depth information regarding the at least one object by applying the first depth information and ground truth depth data of the at least one object to a second learning model (S620).

Specifically, the electronic device 100 may obtain the second depth information having a higher accuracy than the first depth information using the first depth information and the ground truth depth data obtained according to the type of the object.

The electronic device 100 may obtain three-dimensional information of the two-dimensional image based on the second depth information (S630).

In this case, the three-dimensional information may include various pieces of spatial information such as a distance from the object included in the two-dimensional image, three-dimensional shape, and the like.

At least some configurations of the methods according to embodiments of the disclosure described above may be implemented in a form of an application installable in the existing electronic device.

In addition, at least some configurations of the methods according to embodiments of the disclosure described above may be implemented simply by the software update or hardware update in the existing electronic device.

Further, at least some configurations in embodiments of the disclosure described above may be executed through an embedded server prepared in the electronic device or an external server of the electronic device.

At least some configurations of the embodiments described above may be implemented in a recording medium readable by a computer or a similar device using software, hardware, or a combination thereof. In some cases, at least some configurations of the embodiments described in this specification may be implemented as a processor itself. According to the implementation in terms of software, at least some configurations of the embodiments such as procedures and functions described in this specification may be implemented as separate software modules. Each of the software modules may execute one or more functions and operations described in this specification.

Computer instructions for executing processing operations of the electronic device according to the embodiments of the disclosure descried above may be stored in a non-transitory computer-readable medium. When the computer instructions stored in such a non-transitory computer-readable medium are executed by the processor of a specific machine, the computer instructions may enable a specific machine to execute the processing operations of the electronic device according to the embodiments described above.

The non-transitory computer-readable medium is not a medium storing data for a short period of time such as a register, a cache, or a memory, but means a medium that semi-permanently stores data and is readable by a machine. Specific examples of the non-transitory computer-readable medium may include a CD, a DVD, a hard disk, a Blu-ray disc, a USB, a memory card, and a ROM.

Hereinabove, the preferred embodiments of the disclosure have been shown and described, but the disclosure is not limited to specific embodiments described above, various modifications may be made by those skilled in the art without departing from the gist of the disclosure claimed in the claims, and such modifications may not be individually understood from the technical sprit or the prospect of the disclosure.

What is claimed is:

1. An electronic device comprising a learning model trained according to an artificial intelligence algorithm, the electronic device comprising:
   an input unit; and
   a processor configured to:
   based on a two-dimensional image including at least one object being received via the input unit, obtain first depth information regarding the at least one object and information regarding a type of the at least one object by applying the two-dimensional image to a first learning model, the first depth information comprising depth data according to the type of the at least one object,
   obtain second depth information regarding the at least one object by applying the first depth information and ground truth depth data of the at least one object to a second learning model, and
   obtain three-dimensional information regarding the two-dimensional image based on the second depth information, the three-dimensional information comprising a distance from the at least one object, a relative position and an XYZ coordinate value based on the second depth information,
   wherein the first depth information comprises a depth value corresponding to each of a plurality of pixels included in the at least one object,
   wherein the processor is further configured to obtain the second depth information by adjusting the depth value according to a Euclidean distance between the depth value and the ground truth depth data corresponding to each of the plurality of pixels by applying the depth value to the second learning model,
   wherein the depth data included in the first learning model is a representative depth value generalized according to the type of the at least one object,
   wherein the ground truth depth data included in the second learning model is a ground truth depth value obtained by capturing the at least one object with a stereo camera, and
   wherein the processor is further configured to obtain the second depth information by adjusting the depth value of the first depth information to minimize an average of a plurality of Euclidean distances obtained by using the second learning model, the second depth information including information regarding the type of the at least one object based on the depth value included in the second depth information which is more sophisticated than the depth value included in the first depth information.

2. The electronic device according to claim 1, further comprising:
   an image capturing unit,
   wherein the image capturing unit comprises a monochrome camera, and
   wherein the two-dimensional image is an image captured by the monochrome camera.

3. A method for controlling an electronic device comprising a learning model trained according to an artificial intelligence algorithm, the method comprising:
   based on a two-dimensional image including at least one object being received, obtaining first depth information regarding the at least one object and information regarding a type of the at least one object by applying the two-dimensional image to a first learning model, the first depth information comprising depth data according to the type of the at least one object;
   obtaining second depth information regarding the at least one object by applying the first depth information and ground truth depth data of the at least one object to a second learning model; and
   obtaining three-dimensional information regarding the two-dimensional image based on the second depth information, the three-dimensional information comprising a distance from the at least one object, a relative position and an XYZ coordinate value based on the second depth information, wherein the first depth information comprises a depth value corresponding to each of a plurality of pixels included in the at least one object, wherein the obtaining of the second depth information comprises obtaining the second depth information by adjusting the depth value according to a Euclidean distance between the depth value and the ground truth depth data corresponding to each of the plurality of pixels by applying the depth value to the second learning model, wherein the depth data included in the first learning model is a representative depth value generalized according to the type of the at least one object, wherein the ground truth depth data included in the second learning model is a ground truth depth value obtained by capturing the at least one object with a stereo camera, and wherein the obtaining of the second depth information further comprises obtaining the second depth information by adjusting the depth value of the first depth information to minimize an average of a plurality of Euclidean distances obtained by using the second learning model, the second depth information including information regarding the type of the at least one object based on the depth value included in the second depth information which is more sophisticated than the depth value included in the first depth information.

4. The method according to claim 3, wherein the two-dimensional image is an image captured by a monochrome camera.

5. A non-transitory computer readable medium storing computer instructions to enable an electronic device comprising a learning model trained according to an artificial intelligence algorithm to execute an operation based on the computer instructions being executed by a processor of the electronic device, the operation comprising:

based on a two-dimensional image including at least one object being received, obtaining first depth information regarding the at least one object and information regarding a type of the at least one object by applying the two-dimensional image to a first learning model, the first depth information comprising depth data according to the type of the at least one object;

obtaining second depth information regarding the at least one object by applying the first depth information and ground truth depth data of the at least one object to a second learning model; and obtaining three-dimensional information regarding the two-dimensional image based on the second depth information, the three-dimensional information comprising a distance from the at least one object, a relative position and an XYZ coordinate value based on the second depth information, wherein the first depth information comprises a depth value corresponding to each of a plurality of pixels included in the at least one object, wherein the obtaining of the second depth information comprises obtaining the second depth information by adjusting the depth value according to a Euclidean distance between the depth value and the ground truth depth data corresponding to each of the plurality of pixels by applying the depth value to the second learning model, wherein the depth data included in the first learning model is a representative depth value generalized according to the type of the at least one object, wherein the ground truth depth data included in the second learning model is a ground truth depth value obtained by capturing the at least one object with a stereo camera, and wherein the obtaining of the second depth information further comprises obtaining the second depth information by adjusting the depth value of the first depth information to minimize an average of a plurality of Euclidean distances obtained by using the second learning model, the second depth information including information regarding the type of the at least one object based on the depth value included in the second depth information which is more sophisticated than the depth value included in the first depth information.

6. The non-transitory computer readable medium according to claim 5, wherein the two-dimensional image is an image captured by a monochrome camera.

7. The electronic device according to claim 1, wherein the first learning model is trained based on a first depth value and a second depth value generalized according to a specific type of object, and wherein the first depth value corresponds to a first area of the specific type of object and the second depth value corresponds to a second area of the specific type of object, the first depth value being lower than and the second depth value.

8. The electronic device according to claim 7, wherein, based on the type of the at least one object being a vehicle, the first depth value corresponds to a headlight of the vehicle and the second depth value corresponds to a windshield of the vehicle, the first depth value being lower than and the second depth value.

9. The method according to claim 3, wherein the first learning model is trained based on a first depth value and a second depth value generalized according to a specific type of object, and wherein the first depth value corresponds to a first area of the specific type of object and the second depth value corresponds to a second area of the specific type of object, the first depth value being lower than and the second depth value.

10. The method according to claim 9, wherein, based on the type of the at least one object being a vehicle, the first depth value corresponds to a headlight of the vehicle and the second depth value corresponds to a windshield of the vehicle, the first depth value being lower than and the second depth value.

* * * * *